US010003592B2

(12) United States Patent
Prakash et al.

(10) Patent No.: US 10,003,592 B2
(45) Date of Patent: Jun. 19, 2018

(54) ACTIVE DIRECTORY FOR USER AUTHENTICATION IN A HISTORIZATION SYSTEM

(71) Applicant: Invensys Systems, Inc., Foxboro, MA (US)

(72) Inventors: Ravi Kumar Herunde Prakash, Lake Forest, CA (US); Sudhir Gonugunta, Lake Forest, CA (US); John Madden, Friendswood, TX (US); Elliot Middleton, Tyler, TX (US); Olivier Vaillancourt, Laval (CA); Vinay T. Kamath, Rancho Santa Margarita, CA (US)

(73) Assignee: Schneider Electric Software, LLC, Lake Forest, CA (US)

( * ) Notice: Subject to any disclaimer, the term of this patent is extended or adjusted under 35 U.S.C. 154(b) by 50 days.

(21) Appl. No.: 14/639,691

(22) Filed: Mar. 5, 2015

(65) Prior Publication Data
US 2015/0317463 A1    Nov. 5, 2015

Related U.S. Application Data

(60) Provisional application No. 61/988,728, filed on May 5, 2014.

(51) Int. Cl.
*H04L 29/06* (2006.01)
*G06F 21/45* (2013.01)
*G06F 21/41* (2013.01)

(52) U.S. Cl.
CPC .......... *H04L 63/0815* (2013.01); *G06F 21/41* (2013.01); *G06F 21/45* (2013.01)

(58) Field of Classification Search
CPC .......... G06F 21/31; G06F 21/45; H04L 29/06
See application file for complete search history.

(56) References Cited

U.S. PATENT DOCUMENTS

| | | | | |
|---|---|---|---|---|
| 7,089,530 B1 * | 8/2006 | Dardinski | .............. | G05B 15/02 700/83 |
| 7,137,006 B1 * | 11/2006 | Grandcolas | ............. | G06F 21/41 713/180 |
| 7,209,970 B1 * | 4/2007 | Everson | ............ | H04L 29/12009 703/4 |

(Continued)

OTHER PUBLICATIONS

Microsoft (https://web.archive.org/web/20121014064049/http://technet.microsoft.com/en-us/library/cc785913(d=printer,v=ws.10).aspx, Oct. 14, 2012, pp. 1-3).*

(Continued)

*Primary Examiner* — Luu Pham
*Assistant Examiner* — James J Wilcox
(74) *Attorney, Agent, or Firm* — Sennigers Powers LLP

(57) ABSTRACT

A user authentication system enables control of access to historian data through a historian application. The user authentication system creates a user authentication directory for storing user authentication information. The system populates the directory with user authentication information. The system links the directory to a historian application and receives credential data from a user. The system grants access to the historian application when it determines that the credential data from the user matches a portion of the user authentication information on the directory.

9 Claims, 6 Drawing Sheets

(56) References Cited

U.S. PATENT DOCUMENTS

| | | | |
|---|---|---|---|
| 7,225,462 B2* | 5/2007 | Bass | H04L 63/0815 726/4 |
| 7,831,317 B2* | 11/2010 | McGreevy | G06Q 10/06 700/19 |
| 8,965,931 B2* | 2/2015 | McGreevy | G06Q 10/06 707/792 |
| 9,106,642 B1* | 8/2015 | Bhimanaik | G06F 21/335 |
| 9,369,456 B2* | 6/2016 | Singh | H04L 63/0815 |
| 9,497,184 B2* | 11/2016 | Fork | G06F 21/33 |
| 9,531,719 B1* | 12/2016 | Sutton | H04L 63/10 |
| 9,628,493 B2* | 4/2017 | Warshavsky | H04L 63/102 |
| 9,842,134 B2* | 12/2017 | Erickson | G06F 17/30424 |
| 2007/0142941 A1* | 6/2007 | McGreevy | G06Q 10/00 700/83 |
| 2007/0244896 A1* | 10/2007 | Liu | G06F 21/31 |
| 2009/0013394 A1* | 1/2009 | Marcus | H04L 63/0815 726/8 |
| 2009/0019534 A1* | 1/2009 | Bakshi | G06F 21/335 726/6 |
| 2009/0319780 A1* | 12/2009 | Conceicao | H04L 63/104 713/156 |
| 2010/0125612 A1* | 5/2010 | Amradkar | H04L 63/0807 707/802 |
| 2011/0047206 A1* | 2/2011 | Spears | G06F 21/604 709/203 |
| 2011/0282866 A1* | 11/2011 | Erickson | G06F 17/30516 707/722 |
| 2011/0289575 A1* | 11/2011 | Shi | G06F 17/30867 726/8 |
| 2011/0314520 A1* | 12/2011 | Olszewski | G06F 9/468 726/4 |
| 2013/0086381 A1* | 4/2013 | Thomas | H04L 9/3234 713/168 |
| 2013/0124465 A1* | 5/2013 | Pingel | G06F 3/0604 707/610 |
| 2014/0068732 A1* | 3/2014 | Hinton | G06F 21/41 726/6 |
| 2014/0090037 A1* | 3/2014 | Singh | H04L 63/0815 726/7 |
| 2015/0095968 A1* | 4/2015 | Steiner | G06F 21/604 726/1 |
| 2015/0254441 A1* | 9/2015 | Sanso | G06F 21/41 726/9 |
| 2015/0317330 A1* | 11/2015 | Bolotskikh | G06F 17/30076 707/827 |
| 2015/0319227 A1* | 11/2015 | Lie | H04L 67/10 709/202 |
| 2015/0363484 A1* | 12/2015 | Kamath | G06F 17/30997 707/751 |
| 2016/0004734 A1* | 1/2016 | Naryzhny | H04L 67/1097 707/722 |
| 2016/0042194 A1* | 2/2016 | Chakraborty | G06F 3/0605 726/17 |
| 2016/0134619 A1* | 5/2016 | Mikheev | H04L 63/0815 726/8 |
| 2016/0173649 A1* | 6/2016 | Kamath | G06Q 10/06 709/203 |
| 2016/0182527 A1* | 6/2016 | Lietz | H04L 63/105 726/6 |
| 2017/0168993 A1* | 6/2017 | Prakash | H04L 67/10 |
| 2017/0331791 A1* | 11/2017 | Wardell | H04L 63/0281 |
| 2017/0353444 A1* | 12/2017 | Karangutkar | H04L 63/0815 |

OTHER PUBLICATIONS

Brock Allen ("Getting JSON Web Tokens (JWT's) from ADFS via Thinktecture Identity Servers ADFS Integration," retrieved from https://web.archive.org/web/20130418095715/http://brockallen.com/2013/04/14/getting-json-web-tokens-jwts-from-adfs-via-thinktecture-identityservers-adfs-integration, Apr. 18, 2013, pp. 1-3).*

Oracle (Fusion Middleware Security & Administrators Guide for Web Services, 11g Release 1 (11.1.1.5), Apr. 20, 2012, Web Service Security Standards, pp. 1-7).*

Techtarget ("Windows Azure Active Directory Steps out of the Shadows" Dec. 16, 2013, pp. 1-16) retrieved from https://web.archive.org/web/20131216154655/http://searchwindowsserver.techtarget.com/tip/Windows-Azure-Active-Directory-steps-out-of-the-shadows.*

Microsoft Technet ("Best practices for assigning permissions on Active Directory objects," Mar. 20, 2011, pp. 1-2) retrieved from https://web.archive.org/web/20110320005007/http://technet.microsoft.com/en-us/library/cc786285(v=WS.10).aspx.*

Bertocci et al ("Single Sign on with Windows Azure Active Directory: A Deep Dive," Jun. 21, 2013, pp. 1-16).*

Siemens (SIMATIC Process Historian & Reporting, Aug. 2012, pp. 1-8).*

MSDN-Claims Based Architectures, Feb. 5, 2014, pp. 1-14, retrieved from https://web.archive.org/web/20140205221826/https://msdn.microsoft.com/en-us/library/ff359108.aspx.*

Jones—RFC 7519, JSON Web Token, May 2015, pp. 1-32.*

Anchan—"Regaining Single Sign—On Taming the Beast," SIGUCCS '03, ACM, Sep. 21-24, 2003, pp. 166-171.*

Gardei—"Migrating from Novell to Active Directory," SIGUCCS '13, ACM, Nov. 3-8, 2013, pp. 51-55.*

Kadlec—"Implementation of an Advanced Authentication Method within Microsoft Active Directory Network," 2010 Sixth International Conference on Wireless & Mobile Communications, IEEE, 2010, pp. 453-456.*

Kurran—"Enabling Single Sign on Authentication for Web Repositories Using Domain Directory Services," 2008, IEEE, pp. 1- 5.*

* cited by examiner

ACTIVE DIRECTORY FOR USER AUTHENTICATION IN A HISTORIZATION SYSTEM

CROSS REFERENCE TO RELATED APPLICATIONS

This application claims priority of Herunde et al., U.S. provisional application Ser. No. 61/988,728 filed on May 5, 2014, entitled "Active Directory for User Authentication in a Historization System." The entire contents of the above identified application are expressly incorporated herein by reference, including the contents and teachings of any references contained therein.

BACKGROUND

Aspects of the present invention generally relate of the fields of networked computerized industrial control, automation systems and networked computerized systems utilized to monitor, log, and display relevant manufacturing/production events and associated data, and supervisory level control and manufacturing information systems. Such systems generally execute above a regulatory control layer in a process control system to provide guidance to lower level control elements such as, by way of example, programmable logic controllers or distributed control systems (DCSs). Such systems are also employed to acquire and manage historical information relating to processes and their associated outputs. More particularly, aspects of the present invention relate to systems and methods for storing and preserving gathered data and ensuring that the stored data is accessible when necessary. "Historization" is a vital task in the industry as it enables analysis of past data to improve processes.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management and process visualization techniques have been developed to store and maintain the large volumes of data generated by such system. It is a difficult but vital task to ensure that the process is running efficiently.

SUMMARY

Aspects of the present invention relate to a system that stores data from multiple sources and enables access to the data in multiple locations and forms. The system simplifies and streamlines a user's ability to access and analyze data from any location connected to the system. Further, the system maintains a granular system of user access control and advanced data visualization methods.

In one form, a user authentication system enables control of access to historian data through a historian application. The user authentication system creates a user authentication directory for storing user authentication information. The system populates the directory with user authentication information. The system links the directory to a historian application and receives credential data from a user. The system grants access to the historian application when it determines that the credential data from the user matches a portion of the user authentication information on the directory.

In another form, computer-readable media stores instructions for implementing the user authentication system.

In another form, multiple directories are created and each directory is associated with a different group of users. In another form, the user is granted access by generating a token for exchange with the directory.

In yet another form, a method of user authentication embodying aspects of the invention includes creating a directory and populating the directory with user authentication information. The method also includes linking the directory to a historian application and receiving credential data from a user. Further, the method includes grants user access to the historian application when the credential data user matches a portion of the user authentication information.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
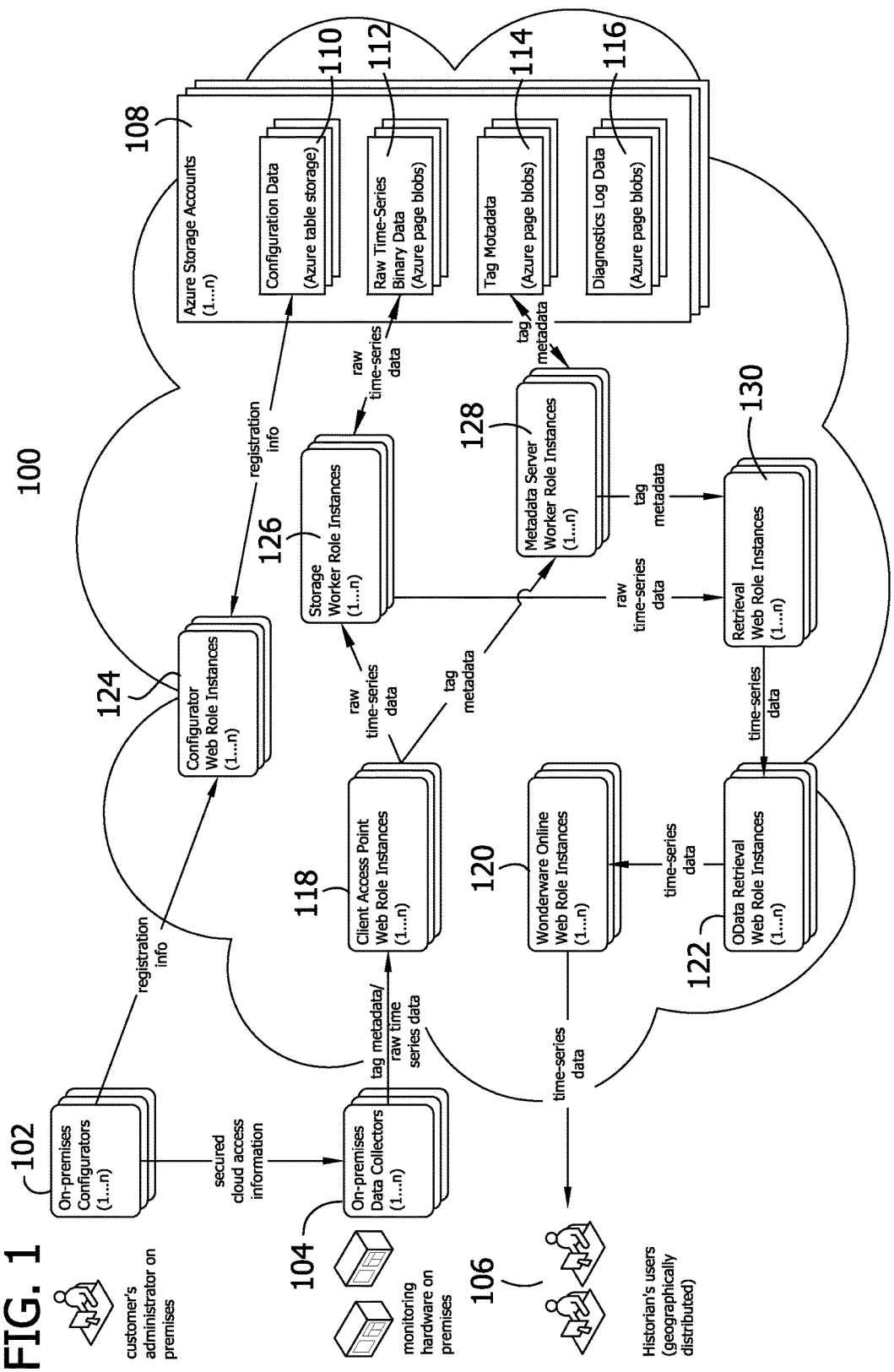
FIG. 1 is a diagram detailing an architecture of a historian system according to an embodiment of the invention.

Referring to FIG. 1, a distributed historian system, generally indicated at 100, enables users to log into the system to easily view relationships between various data, even if the data is stored in different data sources. The historian system 100 can store and use data from various locations and facilities and use cloud storage technology to ensure that all the facilities are connected to all the necessary data. The system 100 forms connections with configurators 102, data collectors 104, and user devices 106 on which the historian data can be accessed. The configurators 102 are modules that may be used by system administrators to configure the functionality of the historian system 100. The data collectors 104 are modules that connect to and monitor hardware in the process control system to which the historian system 100 is connected. The data collectors 104 and configurators 102 may be at different locations throughout the process control system. The user devices 106 comprise devices that are geographically distributed, enabling historian data from the system 100 to be accessed from various locations across a country or throughout the world.

In an embodiment, historian system 100 stores a variety of types of information in storage accounts 108. This information includes configuration data 110, raw time-series binary data 112, tag metadata 114, and diagnostic log data 116. The storage accounts 108 may be organized to use table storage or other configuration, such as page blobs.

In an embodiment, historian system 100 is accessed via web role instances. As shown, configurators 102 access configurator web role instances 124. And data collectors 104 access client access point web role instances 118. Online web role instances 120 are accessed by the user devices 106. The configurators 102 share configuration data and registration information with the configurator web role instances 124. The configuration data and registration information is stored in the storage accounts 108 as configuration data 110. The data collectors 104 share tag metadata and raw time-series data with the client access point web role instances 118. The raw time-series data is shared with storage worker role instances 126 and then stored as raw time-series binary data 112 in the storage accounts 108. The tag metadata is shared with metadata server worker role instances 128 and stored as tag metadata 114 in the storage accounts 108. The storage worker role instances 126 and metadata server worker role instances 128 send raw time-series data and tag metadata to retrieval worker role instances 130. The raw time-series data and tag metadata is converted into time-series data and sent to the online web role instances 120 via data retrieval web role instances 122. Users using the user devices 106 receive the time-series data from the online web role instances 120.

Figure 2:
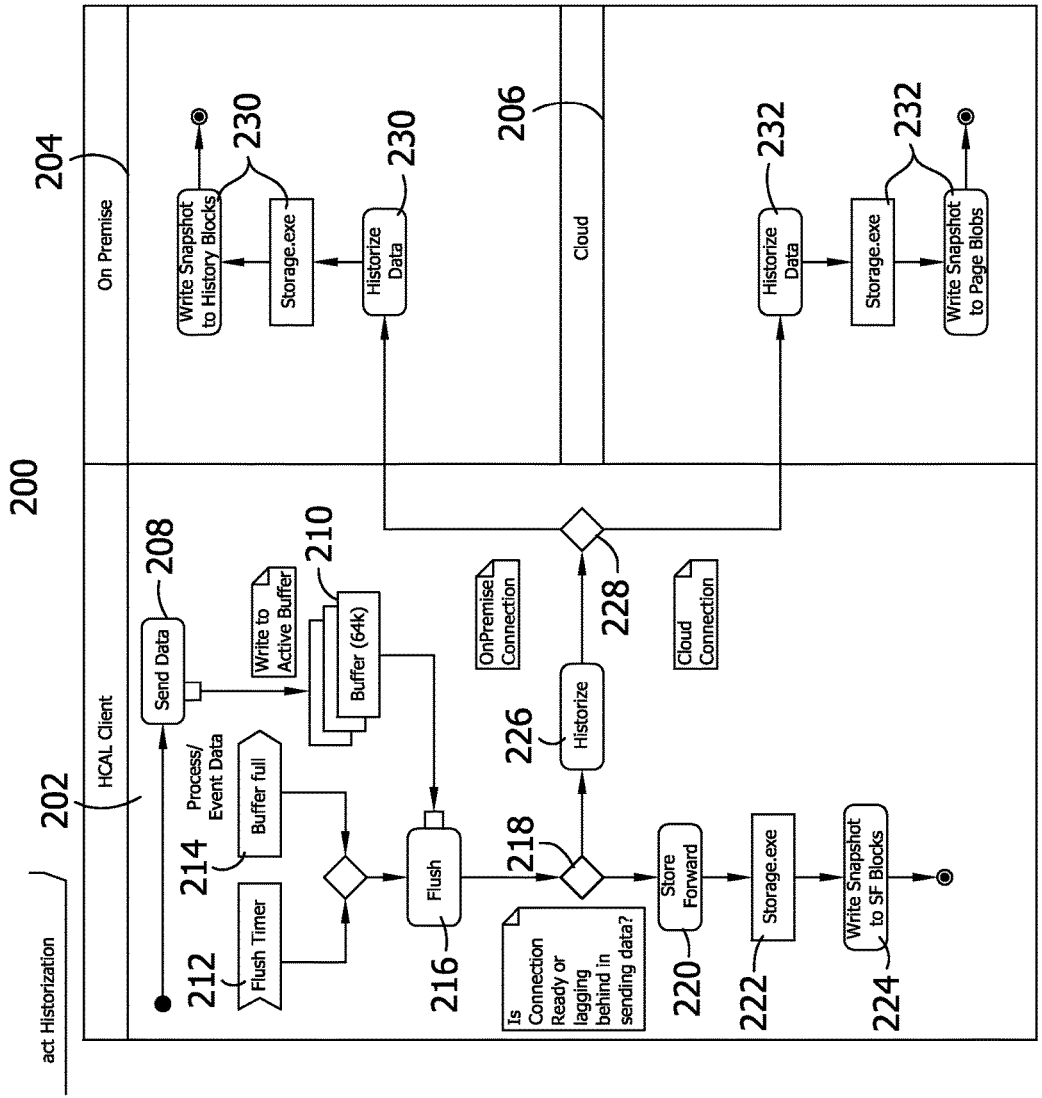
FIG. 2 is an exemplary diagram of a historization workflow performed by the system of FIG. 1.

FIG. 2 describes a workflow 200 for historizing data according to the described system. The Historian Client Access Layer (HCAL) 202 is a client side module used by the client to communicate with historian system 100. The HCAL 202 can be used by one or more different clients for transmitting data to historian system 100. The data to be sent 208 comes into the HCAL 202 and is stored in an active buffer 210. The active buffer 210 has a limited size. When the active buffer is full 214, the active buffer is "flushed" 216, meaning it is cleared of the data and the data is sent to historian 100. There is also a flush timer 212 which will periodically cause the data to be sent from the active buffer 210, even if the active buffer 210 is not yet full.

When historizing 226, the data may be sent to a historian that is on premises 204 or a historian that stores data in the cloud 206 (step 228). The HCAL 202 treats each type of historian in the same way. However, the types of historians may store the data in different ways. In an embodiment, the on-premises historian 204 historizes the data by storing the data as files in history blocks 230. The cloud historian 206 historizes the data by storing the data in page blobs 232, which enable optimized random read and write operations.

In the event that the connection between HCAL 202 and the historian 204 or 206 is not working properly, the flushed data from the active buffer 210 is sent to a store forward module 220 on the client (step 218). The data is stored 222 in the store forward module 220 in the form of snapshots written to store forward blocks 224 until the connection to the historian is functional again and the data can be properly transmitted. The store forward module 220 may also get rid of data after a certain period of time or when it is full. In those cases, it will send an error to the system to indicate that data is not being retained.

Figure 3:
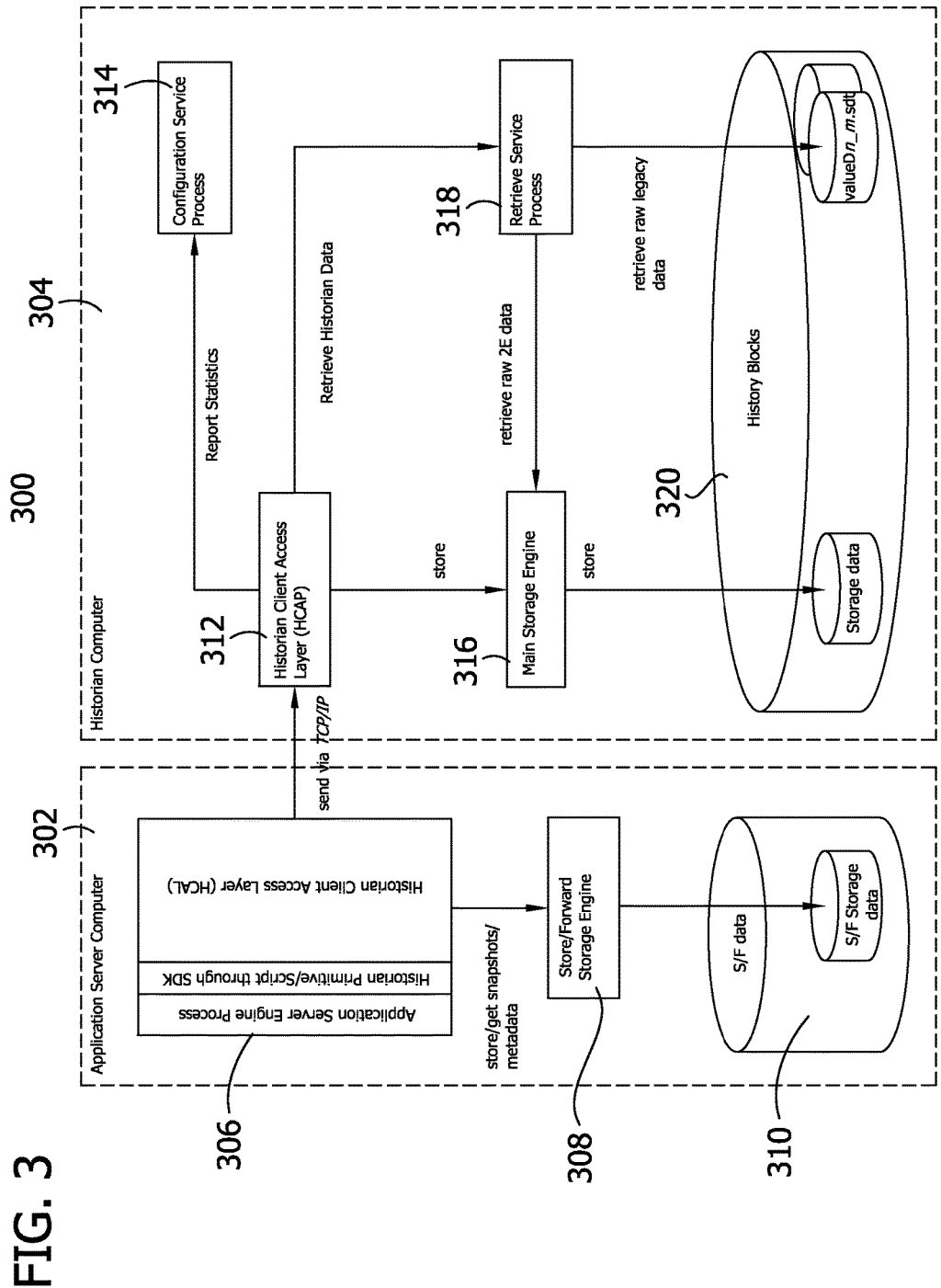
FIG. 3 is an exemplary diagram of the structure of the system of FIG. 1.

FIG. 3 is a diagram displaying the historization system structure in a slightly different way from FIG. 2. An HCAL 306 is hosted on an application server computer 302 and connected to a historian computer 304 and a store forward process 308. The HCAL 306 connects to the historian through a server side module known as the Historian Client Access Point (HCAP) 312. The HCAP 312 has a variety of functions, including sending data received from HCAL 306 to be stored in history blocks 320. The HCAP 312 also serves to report statistics to a configuration service process 314 and retrieve historian data from a retrieval service process 318.

The HCAL 306 connects to the store forward process 308 through a Tier-2 Engine (T2E) which is a storage engine used to control the store forward process. The T2E enables the HCAL to store and retrieve snapshots and metadata 310 of the data being collected and sent to the historian. In an embodiment, the store forward process 308 on the application server computer 302 is a child T2E process related to a main T2E process 316 running on the historian computer 304.

In addition, HCAL 306 provides functions to connect to the historian computer 304 either synchronously or asynchronously. On successful call of the connection function, a connection handle is returned to client. The connection handle can then be used for other subsequent function calls related to this connection. HCAL 306 allows its client to connect to multiple historians. In an embodiment, an "Open-Connection" function is called for each historian. Each call returns different connection handle associated with the connection. HCAL 306 is responsible for establishing and maintaining the connection to the historian computer 304. While connected, HCAL 306 pings the historian computer 304 periodically to keep the connection alive. If the connection is broken, HCAL 306 will also try to restore the connection periodically.

In an embodiment, HCAL 306 connects to the historian computer 304 synchronously. HCAL 306 returns a valid connection handle for a synchronous connection only when the historian computer 304 is accessible and other requirements such as authentication are met.

In an embodiment, HCAL 306 connects to the historian computer 304 asynchronously. Asynchronous connection requests are configured to return a valid connection handle even when the historian 304 is not accessible. Tags and data can be sent immediately after the connection handle is obtained. When disconnected from the historian computer 304, they will be stored in the HCAL's local cache while HCAL 306 tries to establish the connection.

In an embodiment, multiple clients connect to the same historian computer 304 through one instance of HCAL 306. An application engine has a historian primitive sending data to the historian computer 304 while an object script can use the historian software development kit (SDK) to communicate with the same historian 304. Both are accessing the same HCAL 306 instance in the application engine process. These client connections are linked to the same server object. HCAL Parameters common to the destination historian, such as those for store forward, are shared among these connections. To avoid conflicts, certain rules have to be followed.

In the order of connections made, the first connection is treated as the primary connection and connections formed after the first are secondary connections. Parameters set by the primary connection will be in effect until all connections are closed. User credentials of secondary connections have to match with those of the primary connection or the connection will fail. Store Forward parameters can only be set in the primary connection. Parameters set by secondary connections will be ignored and errors returned. Communication parameters such as compression can only be set by the primary connection. Buffer memory size can only be set by the primary connection.

Connections from the HCAL client to the historian must be authenticated before any task can be performed on the historian. The HCAL passes intended level of access (replication, storage, or retrieval) and user credentials in an open connection request. The HCAP logs in to the historian using user credentials supplied from HCAL client and verifies that the user belongs to a user group which allows the level of access. If verified, the open connection request succeeds. Otherwise, a user authentication error will be returned. In a redundancy support environment where the HCAL needs to connect to the HCAP on a standby platform, membership in special group is not required, but the credentials passed from the active platform are required to login to the standby platform, and vice versa.

In an embodiment, the client authenticates the end user through an active directory system such as WINDOWS AZURE ACTIVE DIRECTORY (WAAD). The client connects to a retrieval web service and presents an Authorization Bearer token in the header of a message identifying the end user. Use of a secure sockets layer (SSL) is required for the retrieval web service. The retrieval web service validates the Authorization Bearer token to authenticate the user attempting to access the system.

In an embodiment, the historian system implements multi-tenant support. When a client calls the retrieval web service, it passes a token based on the end user information to the retrieval web service. Based on the token, the retrieval web service determines the tenant associated with the request and only returns data associated with the given tenant. Two piece of information regarding the tenant will be parsed out: tenant name and tenant ID. The tenant name is simply the domain name of the user, so if ray@domain.com is the authenticated user, the tenant name will be "domain.com". The tenant ID is an identification value assigned within the active directory.

The system enables the automatic creation of an active directory for controlling user access to the historian data. In an embodiment, each customer has a separate directory for storing the credentials of its users. The directories are linked to the application to which they control access. As an example, the system may use WINDOWS AZURE ACTIVE DIRECTORY (WAAD) to implement the user authentication directories. The active directories are linked to the historian and other applications to enable users to access aspects of the applications according to their granted levels of access.

Before any customers are added there is a single active directory hosted within the historian site (for example, historian.com). When a new customer is added the system will create an active directory for them and assign a domain to it. In an embodiment, a customer named "customer1" is added to the system. In response, an active directory is created for customer1 called customer1.historian.com. The system creates an administrative user within the newly created active directory, enabling the new customer to administer and add their own users. All username/passwords are stored securely in the customer-specific active directory, isolated from all other customers of the historian site.

Figure 4:
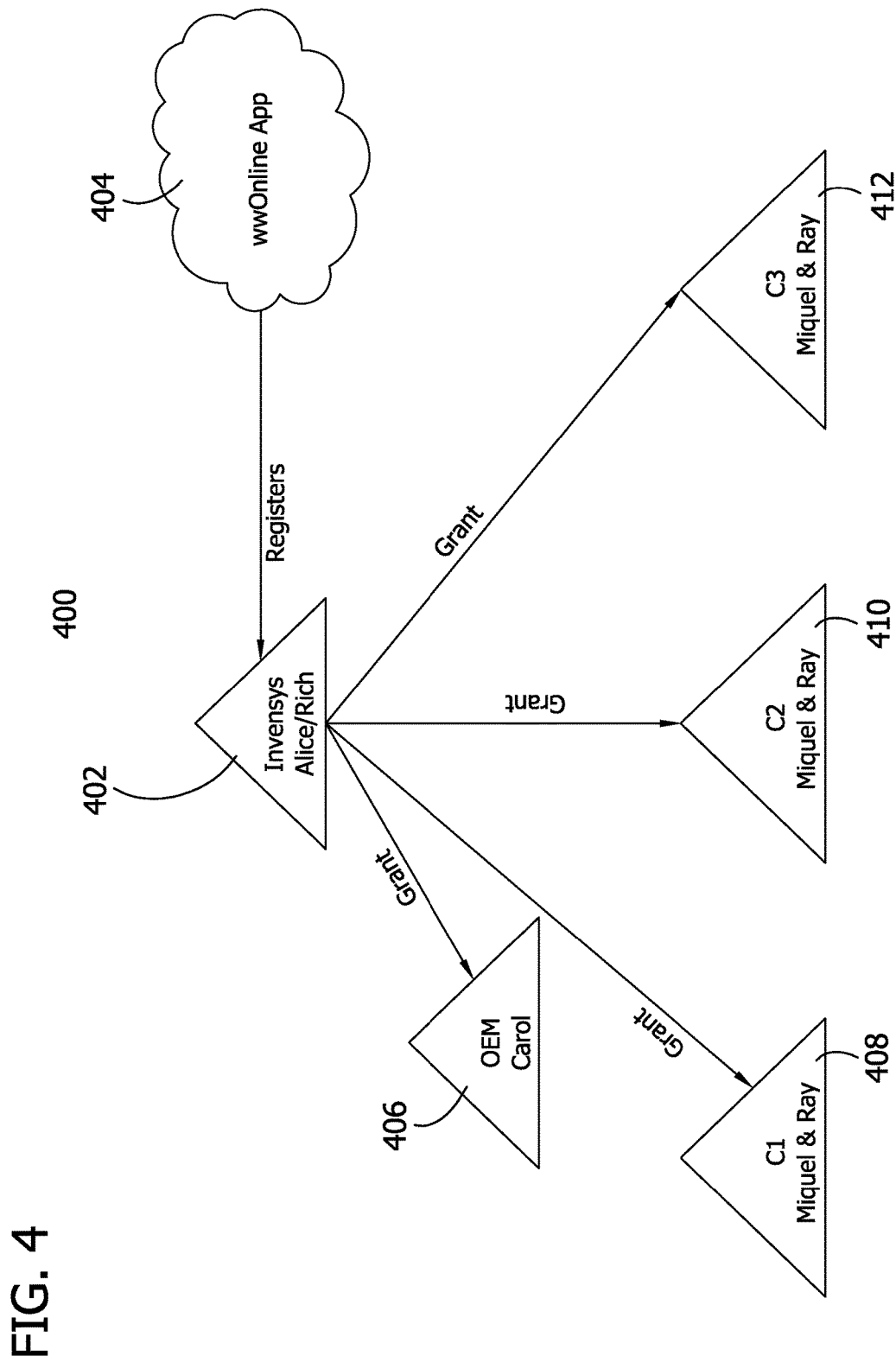
FIG. 4 is an exemplary diagram of various customers being authenticated to use the historian application by the system of FIG. 1.

FIG. 4 shows an exemplary end deployment 400. A main directory 402 is registered with an online application 404. Additional active directories are created and access is granted. The main directory 402 grants access to each of active directories 406, 408, 410, and 412. Each of the new active directories is separate from each other and they contain their own sets of users and access rules.

In an embodiment, the automated creation of active directories may follow the following steps. The system creates a new director including a directory name, a domain, and a country or region. A user navigates to a screen for creating the new directory and fills in information such as the directory name, domain, and country or region. A new domain is created by the user navigating to a new domain screen and providing information. In an embodiment, a new domain requires the creation of a domain name, the selection of a record type (such as TXT files), and the selection of a destination address.

Users are added to the created domain. Adding a user to the created domain comprises selecting the user's role or roles and creating a password for the user. In an embodiment, an administrator user is created first for OEM and end customer active directories and that user is given the ability to associate other users with the created active directory. Passwords are issued to users upon initially being added to the active directory. The passwords may be changeable by the users.

The newly created active directory is linked to the historian application by adding the application to the directory. In an embodiment, this process comprises entering a URL for the content server, entering an app ID for the application, and setting whether the application will be multi-tenant. The configuration information defining the link between the active directory and the historian application may be saved, as additional active directories that are connected to the historian application also make use of the configuration information. The configuration information may comprise a realm, audience identifier, federation metadata location, application client identifier, and application key.

After the active directory is linked to the historian application, access to the historian application is granted to users. In an embodiment, an administrator user of the active directory grants access to the historian application to users of a tenant. This process comprises copying the tenant IDs of the users to whom access is being granted to the tenant database and adding the tenant users from the application to the tenant database of the directory.

Figure 5:
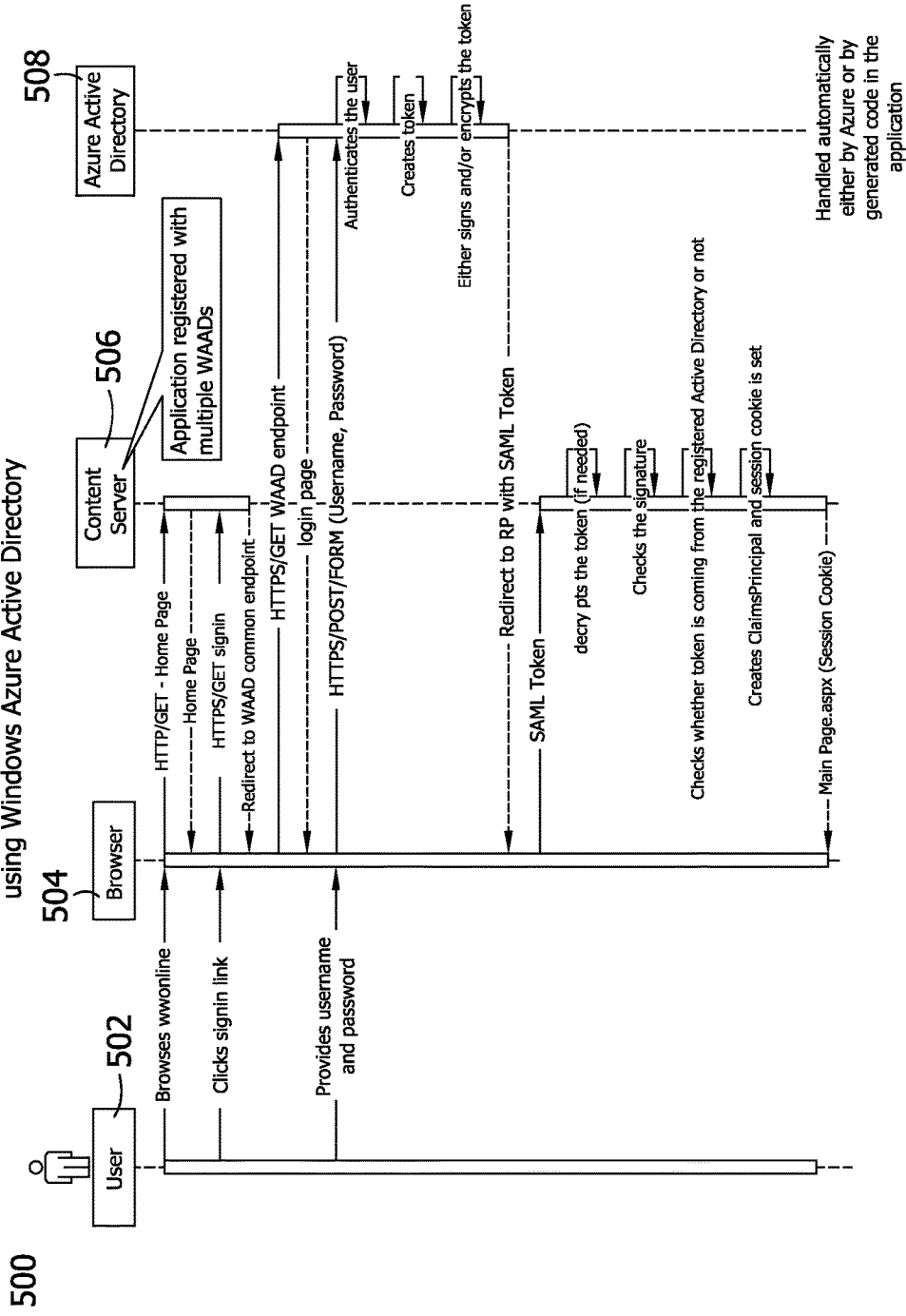
FIG. 5 is an exemplary sequence diagram illustrating how user authentication is done in the system of FIG. 1 using an active directory.

FIG. 5 shows a sequence diagram 500 of the user authentication process. A user 502 may attempt to log in to a content server 506 through a web browser 504. Upon accessing the system home page, the user 502 chooses a "signin link", which will redirect the browser 504 to open a login page from an active directory 508. The user 502 may enter credentials such as a user name and password to attempt to login to the active directory 508. The active directory 508 authenticates the user's 502 credentials, and if they are satisfactory, the active directory 508 generates a "Security Assertion Markup Language" (SAML) Token, which is returned to the browser 504 for use. In an embodiment, the SAML token is tenant-specific and only grants access to the active directory 508 assigned to the tenant of the user 502.

Once the user 502 has a valid SAML token, they are redirected back to the content server 506, where they provide their token. The content server 506 confirms that the token is valid and opens a session for the user 502 to access the content on the server.

Navigating to the home page (e.g., historian.com) presents a generic home page. Clicking sign-in displays a generic login screen presented by the common active directory.

By virtue of the domain portion of the username (for example, onlinecustomer1.historian.com), the user 502 gets authenticated against an active directory 508 that was created for that domain. The system can 'brand' the individual active directory 508 authentication pages. The login page comes from the company specific active directory 508.

Figure 6:
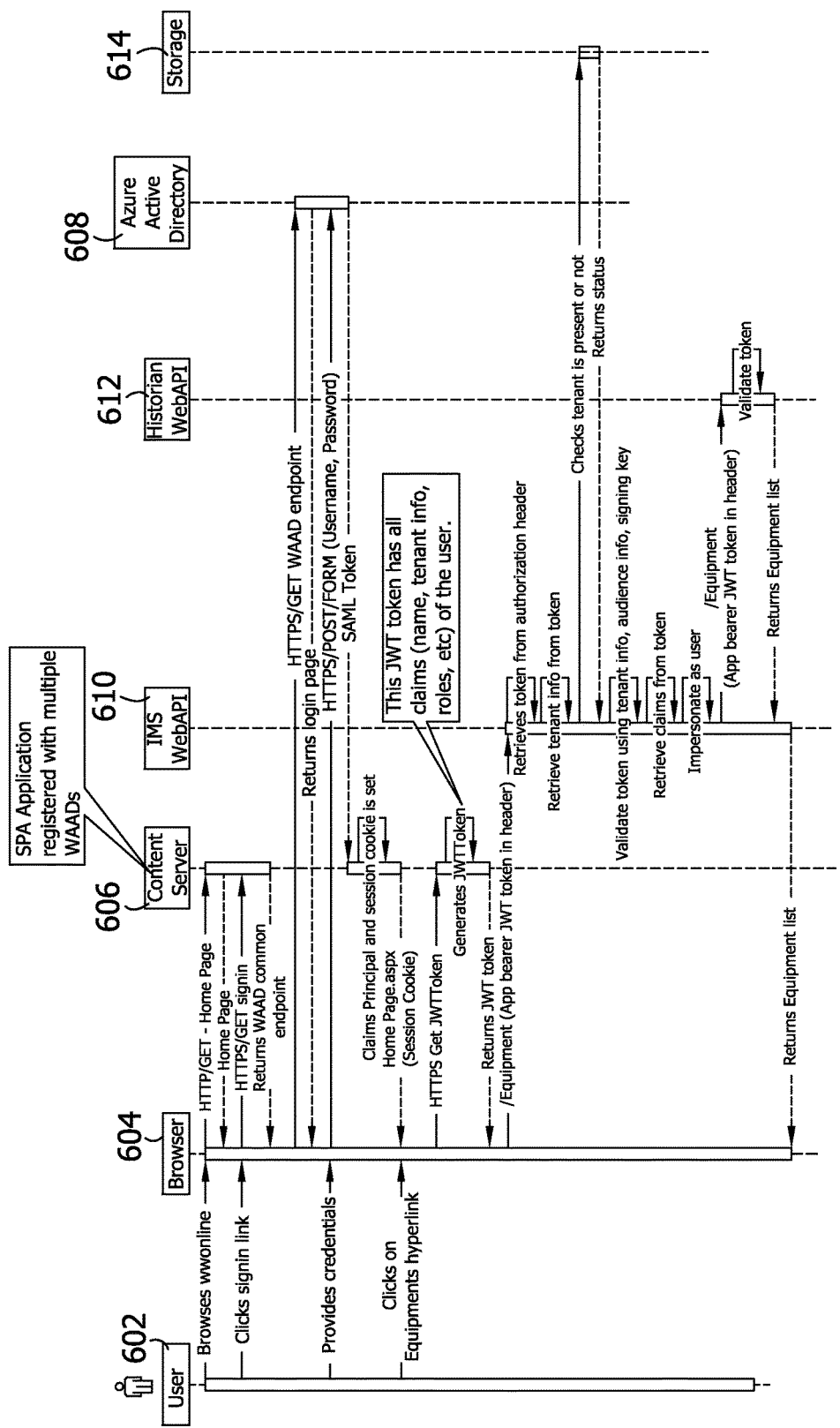
FIG. 6 is an exemplary sequence diagram illustrating user authentication in the system of FIG. 1 including SAML to JWT token conversion.

FIG. 6 is a sequence diagram 600 that expands on FIG. 5. A user 602 may want to access certain APIs on the system that require a separate JSON Web Token (JWT) from the SAML token. Once the user 602 has an open session by virtue of having a valid SAML token, as described above, the user may click on a hyperlink to access some data from a historian storage 614. Accessing the data may require the creation of a JWT. Upon selecting the hyperlink, a content server 606 generates a JWT from the SAML for use with the APIs to access the desired data. A browser 604 sends an HTTP request to a WebAPI 610 containing the valid JWT. The system will then validate the JWT against the list of allowed tenants in storage 614 and return the desired historian data from a historian WebAPI 612 to the user's browser.

The JWT token is a light weight token that can be used on the client side through Internet Explorer and javascript. This enables the system to use the active directory as a backend for authentication and still use a browser to interact with multiple websites that can provide a rich client-like web experience. The use of the JWT eliminates the need for the browser to interact with only its site of origin. In an embodiment, the JWT token is tenant specific and only grants access to data in the active directory or directories assigned to the tenant of the user.

The JWT is used to present evidence of authentication to the data retrieval layers of the architecture. These issued JWT tokens have a very short expiration time and are used once and then discarded. Once the browser has received this token it places it into a HTTP request header and requests data from the content server or WebAPI data layer. These layers authenticate the token by checking its signature, claims, and signing key (this assures that it trusts the original source of the token).

In the process control environment, some users are given control over certain aspects of the control environment and denied access to other aspects. For example, one user is in charge of the line of equipment associated with a process cell. Another user is in charge of a particular type of equipment instantiated throughout several lines of equipment in a process facility. In these kinds of cases, users are permitted access the historian system for aspects of the process control system with which they work with while they are denied access for unrelated aspects.

The present invention uses a small immutable security token to provide a guarantee of the current user in an embodiment. An external trusted token provider issues the token to authenticate the user's identity. In addition the token associates the user with her group membership classes. In the management system discussed above, the token might associate one user with a process cell (e.g., the user who controls a line of equipment) and another user with a particular operation (e.g., the user who works with a particular type of equipment). The security features can extrapolate the user's specific roles and permissions and do any required authorization. Because the security token is passed from a trusted external provider, it can be passed from the historian system to other products that also trust the provider. This in turn allows a single sign-on screen and permits the authentication process to be maintained external to the historian system.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A user authentication system comprising:
a processor;
a memory device coupled to the processor;
processor-executable instructions stored on the memory device and executed on the processor, said instructions comprising:
instructions for registering a main directory within a historian application;
instructions for creating a plurality of active directories and assigning a domain to each active directory, wherein each active directory and the domain assigned thereto are associated with a tenant having its own set of users and access rules, wherein each active directory stores user credentials for controlling access to the historian application by the users thereof, and wherein the active directories are separate from each other;
instructions for populating a first active directory of the plurality with user authentication information for a user of the historian application upon the user being added to the domain assigned to the first active directory;
instructions for assigning a tenant identifier to the first active directory, the tenant identifier identifying a group of users associated with the first active directory;
instructions for linking the first active directory to the historian application through the main directory by adding an application identifier to the first active directory, wherein the application identifier identifies the historian application as having access thereto controlled by the first active directory, and wherein the historian application is associated with a process control system;
instructions for redirecting a web browser to open a login page from the first active directory upon receiving a sign-in request for a historian storage associated with the first active directory, wherein one or more of the tenants are allowed access to the historian storage;
instructions for receiving credential data for the first active directory from the user;
instructions for generating a first token when the credential data matches a portion of the user authentication information, wherein the tenant identifier is included in the first token when the credential data received from the user includes the tenant identifier;
instructions for returning the first token to the web browser to open a session between the web browser and the first active directory;
instructions for converting the first token into a second token, wherein the second token is a single-use token, and wherein the second token includes a role claim based on a role of the user within the process control system and includes the tenant identifier from the first token;
instructions for validating the second token against the tenants allowed access to the historian storage; and
instructions for granting the user access to the historian application for aspects of the process control system associated with the user by the role claim of the second token upon validation thereof and to data stored in one or more storage accounts via the historian application when the second token includes the tenant identifier.

2. The user authentication system of claim 1, wherein the system grants the user access to a set of information stored by the historian storage based on the user authentication information.

3. The user authentication system of claim 1, wherein said instructions further comprise:
instructions for saving the application identifier defining the link between the first active directory and the historian application;

instructions for creating a second active directory, wherein the second active directory is separate from the first active directory; and instructions for linking the second active directory to the historian application by adding the saved application identifier to the second active directory, wherein the application identifier identifies the historian application as having access thereto further controlled by the second active directory.

4. A method for authenticating users accessing a historian application comprising:

registering a main directory with the historian application;

creating a plurality of active directories stored on a memory device, the active directories each storing user credentials for controlling access to the historian application, and the active directories each being separate from the other active directories;

assigning a domain to each active directory, each active directory and the domain assigned thereto being associated with a tenant having its own set of users and access rules;

populating a first active directory of the plurality with user authentication information for a user of the historian application in response to the user being added to the domain assigned to the first active directory;

assigning a tenant identifier to the first active directory, the tenant identifier identifying a group of users associated with the first active directory;

linking the first active directory to the historian application through the main directory by adding an application identifier to the first active directory, the application identifier identifying the historian application as having access thereto controlled by the first active directory, the historian application associated with a process control system;

receiving credential data for the first active directory from the user;

generating a first token when the credential data matches a portion of the user authentication information;

including the tenant identifier in the first token when the credential data received from the user includes the tenant identifier;

opening a session between a web browser and the first active directory upon validity confirmation of the first token;

converting the first token into a second token, wherein the second token is a single-use token, and wherein the second token includes a role claim based on a role of the user within the process control system;

including the tenant identifier from the first token in the second token; and granting the user access to the historian application for aspects of the process control system associated with the user by the role claim of the second token and to data stored in one or more storage accounts via the historian application when the second token includes the tenant identifier.

5. The method for authenticating users of claim 4, wherein the user is granted access to a set of information stored by the historian application based on the user authentication information.

6. The method for authenticating users of claim 4, further comprising:

saving the application identifier defining the link between the first active directory and the historian application;

creating a second active directory stored on the memory device, the second active directory separate from the first active directory; and linking the second active directory to the historian application by adding the saved application identifier to the second active directory, wherein the application identifier identifies the historian application as having access thereto further controlled by the second active directory.

7. A tangible, non-transitory computer-readable storage media storing processor-executable instructions that, when executed by a processor, perform a method for implementing a user authentication system, the method comprising:

creating a first directory stored on a memory device, the first directory storing user access credentials for controlling access to a historian application;

assigning a domain to the first directory, wherein the first directory and the domain assigned thereto is associated with a tenant having a set of users and access rules;

populating the first directory with user authentication information for a user of the historian application in response to the user being added to the domain assigned to the first directory;

assigning a tenant identifier to the first directory, the tenant identifier identifying a group of users associated with the first directory;

linking the first directory to the historian application by adding an application identifier to the first directory, wherein the application identifier identifies the historian application as having access thereto controlled by the first directory, and wherein the historian application is associated with a process control system;

receiving credential data from a user;

generating a first token when the credential data matches a portion of the user authentication information;

including the tenant identifier in the first token when the credential data received from the user includes the tenant identifier;

converting the first token into a second token, wherein the second token is a single-use token, and wherein the second token includes a role claim based on a role of the user within the process control system;

including the tenant identifier from the first token in the second token; and granting the user access to the historian application for aspects of the process control system associated with the user by the role claim of the second token and to data stored in one or more storage accounts via the historian application when the second token includes the tenant identifier.

8. The tangible, non-transitory computer-readable storage media of claim 7, further comprising processor-executable instructions that, when executed by a processor, create multiple directories, wherein each directory is assigned to a group of users.

9. The tangible, non-transitory computer-readable storage media of claim 7, wherein the processor-executable instructions, when executed by the processor, further perform:

saving the application identifier defining the link between the first directory and the historian application;

creating a second directory, wherein the second directory is separate from the first directory; and linking the second directory to the historian application by adding the saved application identifier to the second directory, wherein the application identifier identifies the historian application as having access thereto further controlled by the second directory.

\* \* \* \* \*